Figure 1:
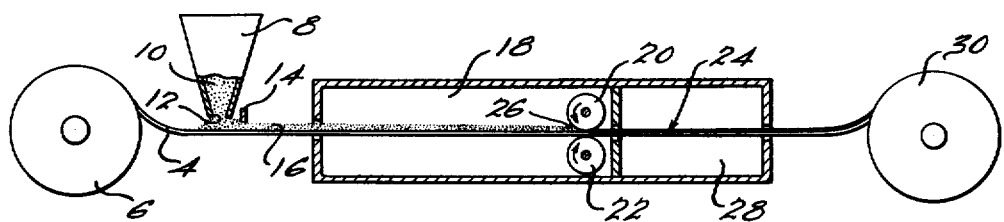

INVENTORS.
Victor Gallatin,
James C. Gould
BY
Harness, Dickey & Pierce
ATTORNEYS.

United States Patent Office 3,094,415
Patented June 18, 1963

3,094,415
COMPOSITE BEARINGS AND METHOD OF MAKING SAME
Victor Gallatin and James C. Gould, Ann Arbor, Mich., assignors to Federal-Mogul-Bower Bearings, Inc., Detroit, Mich., a corporation of Michigan
Filed Dec. 2, 1960, Ser. No. 73,421
7 Claims. (Cl. 75—208)

The present invention broadly relates to bearings, and more particularly to a composite bearing material comprising an aluminum-tin alloy bearing lining tenaciously bonded to a hard metal backing strip and to an improved method for making the composite bearing material.

Composite bearings of the general type to which the present invention is applicable, comprise a strong hard metal backing strip to one surface of which a thin bearing lining is applied and tenaciously bonded thereto. Composite bearing materials of this general type have heretofore been made by a number of different methods including applying and bonding a thin sheet of a bearing alloy to the surface of a hard metal backing strip, by casting a molten bearing alloy on the surface of the backing strip, or by utilizing powder metallurgical techniques wherein a powder blend of the desired composition is sintered on the surface of the hard metal backing strip and tenaciously bonded thereto. In each case, the use of a hard metal backing strip is intended to support the relatively soft bearing lining and thereby prevent excessive deformation when subjected to high loads during use.

A variety of metals and metal alloys have been used in forming the bearing lining such as, for example, copper and aluminum in combination with one or more of the so-called lubricity metals such as, for example, lead, tin, cadmium and the like. Composite bearing materials having a bearing lining thereon comprising aluminum and tin are particularly satisfactory for a large number of bearing uses such as in internal combustion engines and the like, because of their high corrosion, fatigue, and seizure resistance; excellent conformability and imbeddability characteristics, and their excellent wear characteristics enabling them to be utilized with unhardened steel shafts without causing excessive shaft wear. Aluminum-tin bearing linings having tin contents ranging from about 18% to about 25% are particularly satisfactory bearing materials.

Although molten tin is miscible with molten aluminum in any proportion, upon subsequent freezing or solidification the tin segregates undesirably when present in amounts greater than about 7%. This factor has restricted the use of high tin-aluminum alloy bearings and has represented a continuing problem in the manufacture of aluminum-tin alloy bearings having tin contents in excess of about 7%. Various casting techniques have heretofore been employed for forming aluminum-tin alloys having relatively high percentages of tin but these methods or techniques require relatively complex and closely controlled heat treating steps to form a stable aluminum-tin alloy which is of adequate strength and possesses the requisite bearing properties.

Powder metallurgical techniques have also been utilized such as the method disclosed in United States Patent No. 2,815,567 for forming composite bearing materials having an aluminum-tin bearing alloy bonded to the surface of a hard metal backing strip. In accordance with the teachings of the aforementioned patent powder metallurgical techniques are employed utilizing elemental aluminum and elemental tin powders to produce a composite bearing material. However, the excessive exudation of molten tin from the bearing lining during the hot rolling operation limits the maximum quantity of tin that can be incorporated in the bearing lining. Although the method disclosed in the aforementioned patent is a simple and effective method of forming aluminum-tin bearing linings, tin contents in excess of about 15% cannot be obtained.

Accordingly, it is a primary object of the present invention to provide an improved process for manufacturing composite bearing materials by utilizing powder metallurgical techniques whereby aluminum-tin bearing alloys which contain tin contents in excess of that heretofore obtainable are tenaciously bonded to a hard metal backing strip.

Another object of the present invention is to provide an improved process for making a composite bearing material comprising a hard metal backing strip having an aluminum-tin bearing lining tenaciously bonded to one surface thereof and which process is simple to operate and control, is adapted to high capacity production, and is of economical operation.

Still another object of the present invention is to provide an improved process for applying and tenaciously bonding an aluminum-tin alloy layer on the surface of a hard metal backing strip and which aluminum-tin alloy layer contains tin in contents ranging up to about 30%.

Figure 2:
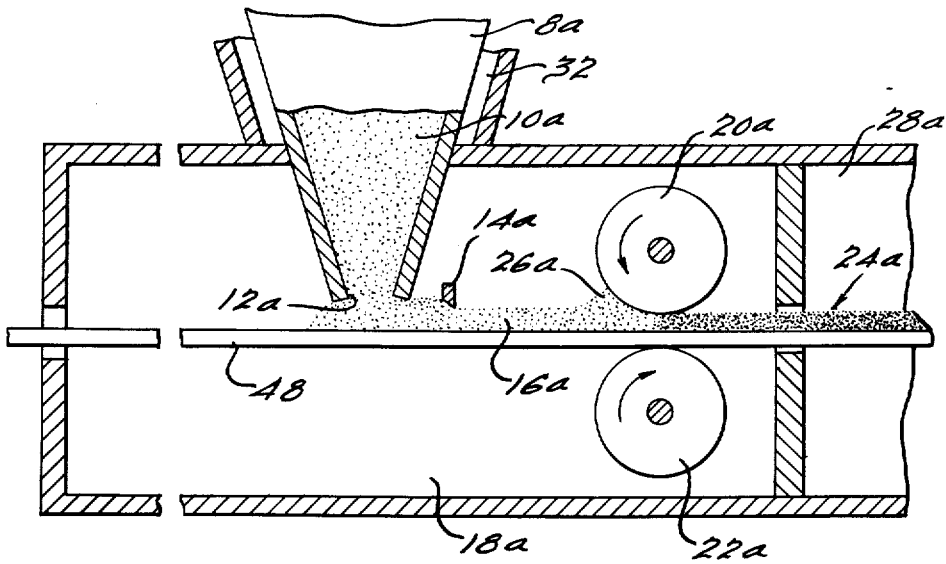

Other objects and advantages of the present invention will become apparent from the following detailed decription taken in conjunction with the accompanying drawings, wherein:

FIGURE 1 is a diagrammatic view partly in section illustrating an apparatus for applying and tenaciously bonding an aluminum-tin alloy bearing layer to the surface of a hard metal backing strip in accordance with one practice of the present invention; and FIG. 2 is a fragmentary diagrammatic view partly in section illustrating an alternate apparatus from that shown in FIGURE 1.

The aluminum tin-bearing alloy containing tin in proportions up to about 30% applied and bonded to the surface of a hard metal backing strip is based on the discovery that by employing prealloyed aluminum-tin powders of the desired composition or in combination with elemental aluminum and/or tin powders in the appropriate proportions, the preheated powder or powder blend can be densified by hot rolling without incurring an appreciable loss of molten tin by exudation enabling the manufacture of composite bearing materials having an aluminum-tin bearing lining tenaciously bonded to a backing strip and containing up to about 30% tin. While this discovery has enabled the successful manufacture of composite bearing materials having a bearing lining comprising an aluminum-tin alloy containing in excess of about 15% tin by powder metallurgical techniques, it will be apreciated that the method comprising the present invention is equally applicable to the manufacture of aluminum-tin composite bearing materials having tin contents below about 15% and within the ranges heretofore obtainable by the method disclosed in the aforementioned patent.

It will be understood that the compositions of the aluminum-tin bearing alloy as described in this specification and in the subjoined claims are expressed, unless otherwise noted, in terms of percentages by weight.

The aluminum-tin bearing lining tenaciously bonded to the surface of the backing strip is characterized as a densely compacted mass comprising a network of matrix of aluminum or aluminum alloy having tin finely distributed throughout the body thereof. The specific composition of the resultant aluminum-tin alloy is established by the composition of the powder employed which preferably consists entirely of a prealloyed aluminum-tin powder having a composition corresponding to that desired in the resultant bearing lining.

It is also contemplated within the scope of the present invention that the prealloyed aluminum-tin powder having a known tin content can be blended with an elemental tin powder in percentages up to about 15% enabling the manufacture of aluminum-tin alloy linings having high tin contents without incurring an appreciable loss of tin by exudation during the hot rolling operation. When the content of elemental tin powder in the powder blend exceeds about 15% exudation of tin occurs during the hot rolling operation in a manner similar to that encountered in the method disclosed in the aforementioned patent. As a result, the tin content in the resultant bearing alloy prepared from a blend of prealloyed aluminum-tin powder and elemental tin powder is restricted to the quantity of tin in the prealloyed powder plus up to about 15% as introduced in the form of elemental tin powder.

It is also contemplated that elemental aluminum powder can be blended with a desired proportion of prealloyed aluminum-tin powder of a known tin content producing therewith a resultant aluminum-tin alloy having a tin content below that of the prealloyed powder. The preferred method, however, comprises selecting a prealloyed aluminum-tin powder having a composition corresponding to that desired in the resultant bearing lining.

The aluminum constituent of the prealloyed aluminum-tin powders and elemental aluminum powders which can be satisfactorily used in the practice of the present invention includes aluminum and alloys thereof consisting primarily of aluminum and minor quantities of such other conventional metals and/or elements as, for example, silicon, copper, nickel, magnesium and the like. The inclusion of such other prealloying constituents is generally desirable in order to impart a greater strength and toughness to the aluminum matrix of the bearing lining formed to enable it to withstand high loading such as may be encountered in heavy duty operation. As a typical example, a prealloyed aluminum-tin powder containing 18% tin may include 1% copper, 1½% silicon, ½% nickel, and the balance aluminum.

The particle size of the prealloyed powder and of the elemental powder, if any, blended therewith, can generally range in size from about 100 mesh to less than about 325 mesh. It is desirable that the particles in the powders employed range in size throughout the aforementioned range so as to provide optimum bond strength between the bearing lining and the hard metal backing strip and ultimate physical characteristics of the lining itself. Prealloyed powders having a particle size distributed through the aforementioned range and having in the order of about 50% less than 325 mesh are preferred.

In those instances wherein an elemental tin and/or aluminum powder is added to and blended with the prealloyed aluminum-tin powder, it is generally desirable that the particle sizes of the several powders incorporated in the blend be about the same. In the event some variation exists, it is preferred that the additive elemental tin powder be smaller in size than the prealloyed aluminum-tin powder or elemental aluminum powder which form the aluminum matrix of the lining.

Prealloyed powders having particle sizes within the above mentioned ranges are now available containing tin in any proportion usually ranging from about 7% up to about 30%. These powders alone can be directly applied to the surface of the hard metal backing strip or can be blended with an appropriate proportion of the elemental aluminum and/or tin powders when desired in any one of a number of suitable blending apparatus such as a double cone mixer, for instance, forming therewith a substantially homogeneous powder blend. Aluminum-tin bearing linings containing from about 18% to about 25% tin possess particularly excellent bearing characteristics and this constitutes the preferred composition range. The prealloyed aluminum-tin powder or powder blend is applied to the surface of the hard metal backing strip in accordance with one embodiment of the present invention as shown in FIGURE 1. As shown in the drawing, a hard metal backing strip 4 is unwound from a feed spool 6 and extended substantially horizontally therefrom beneath a hopper 8 containing a prealloyed aluminum-tin powder 10 of the desired composition or a blend of prealloyed powder incorporating a desired proportion of elemental aluminum and/or tin powder. The hard metal backing strip 4 may comprise any one of a variety of suitable hard metals such as steel, for example, which impart the desired strength and toughness to the composite bearing material subsequently produced. Steel comprises the preferred material and is of high strength and toughness enabling the composite bearing material after formation to be thereafter subjected to further mechanical working such as stamping, blanking, punching, and the like, enabling formation of the composite bearing material into sleeve-type bearings, for example, of the desired configuration and size.

As the backing strip 4 moves in a continuous manner beneath a metering aperture 12 in the base of the hopper 8, a predetermined quantity of the powder 10 contained in the hopper is deposited on the surface of the backing strip 4. The backing strip 4 with the powder 10 on the upper surface thereof thereafter advances beneath a suitable gate or spreader 14 which smoothens and distributes the powder into a layer 16 of substantially uniform thickness. The backing strip 4 with the substantially uniform powder layer 16 thereon thereafter passes into a heating chamber 18 which is maintained at an elevated temperature by any one of a number of means well known in the art and is provided with a reducing atmosphere such as, for example, a cracked gas atmosphere. The reducing atmosphere in the heating chamber 18 prevents oxidation of the powder blend and of the surface of the backing strip 4 assuring a tenacious bond between the powder layer 16 and the backing strip on subsequent hot rolling thereof.

The heating chamber 18 is maintained at a temperature ranging from about 700° F. up to about 1100° F. and preferably from about 800° F. to about 900° F. At preheat temperatures below about 700° F. excessive pressures must be employed in the hot rolling and compacting step hereinafter to be described to obtain a satisfactory bond between the powder layer and the hard metal backing strip. On the other hand, temperatures in excess of about 1100° F. are undesirable inasmuch as at these higher temperatures the formation of undesirable ferrous-aluminum compounds is promoted which detracts from the physical properties of the resultant composite bearing material. Accordingly, while temperatures ranging from about 700° F. to about 1100° F. can be employed, a temperature range in the heating chamber 18 in the order of about 800° F. to about 900° F. is preferred since only reasonable hot rolling pressures are required to obtain tenacious bonds of the bearing lining and the formation of ferrous-aluminum compounds is inhibited.

The heated powder layer 16 superposed on the upper surface of the backing strip 4 prior to hot rolling is in a relatively fluffy and free-flowing state. Concurrent densification and sintering of the powder layer 16 and tenacious bonding thereof to the surface of the backing strip is accomplished by passing the strip and powder layer thereon between rotatably driven upper and lower compacting rolls 20 and 22, respectively, forming therewith a composite bearing strip 24. The peripheral speed of the lower roll 22 is substantially equal to the linear feed rate of the backing strip 4. The peripheral speed of the upper roll 20, however, which is disposed in contact with the powder layer 16 rotates at a speed less than the linear feed rate of the backing strip providing therewith a combined hot compacting and extrusion operation on the powder layer. The reduced speed of rotation of the upper roll 20 can be satisfactorily achieved by a number of means such as by employing a slip-clutch mechanism or an independent reduction drive mechanism, for example, whereby the rate of rotation of the upper roll with respect to the linear rate of feed of the backing strip can be maintained within relatively narrow controlled limits.

The first function achieved by the upper and lower compacting rolls 20 and 22, respectively, is to compress and densify the powder layer 16 removing the voids therefrom. As the strip moves directly between the compacting rolls sufficient pressure is exerted on the powder layer by the upper roll 20 causing deformation, elongation, and scuffing of the individual particles resulting in an exposure of fresh new metal promoting the wetting of the surfaces of the particles and bonding to each other and to the upper surface of the backing strip 4. This combined compacting and extrusion effect achieved through the reduced upper roll rotation constitutes an important feature of the present method and contributes to the formation of a substantially dense high strength aluminum-tin bearing lining which is tenaciously bonded to the backing strip.

By virtue of the reduced speed of rotation of the upper roll 20 lower pressures can be employed to achieve satisfactory sintering of the powder particles and concurrent tenacious bonding thereof to the surface of the backing strip. The rolling pressures employed are such as to produce a reduction in the thickness of the backing strip 4 ranging up to about 5% of its original thickness and more generally, a reduction in the order of from about 1% to about 2% is obtained. The peripheral speed of the upper roll 20 relative to the linear feed rate of the backing strip and the powder layer 16 thereon can be varied depending on the specific temperature conditions and composition of the powder layer employed to achieve the optimum results. Peripheral speeds ranging from about one-tenth to about one-fifth the linear speed of the strip have been found particularly satisfactory in forming a densely compacted, high strength lining tenaciously bonded to the backing strip over substantially the entire surface therebetween. As a result of the rolling action applied to the powder layer 16, a build-up or wave 26 of the powder layer adjacent to the inlet side of the upper roll 20 is formed which is subsequently compacted and extruded into a dense compacted bearing lining forming the composite strip 24 as it passes between the compacting rolls. In addition to densifying, extruding and tenaciously bonding the dense compacted bearing lining to the backing strip, the hot rolling operation also serves to accurately size the thickness of the composite strip 24 as it leaves the rolls.

The composite strip 24 after emerging from the exit side of the compacting rolls 20, 22 passes from the heating chamber 18 into a cooling chamber 28 wherein the composite strip is rapidly cooled to about room temperature in a nonoxidizing atmosphere. It is generally desired to cool the composite strip 24 rapidly immediately after compacting to prevent or inhibit the formation of brittle ferrous aluminum compounds as a result of the reaction between the bearing lining and backing strip which have a tendency to reduce the strength of the bond therebetween. The temperature necessary to achieve a relatively rapid cooling of the composite strip in accordance with the preferred practice of the present invention is dependent upon such related factors as the size and heat capacity of the composite strip 24, the length of the cooling chamber 28, and the linear speed of the composite strip therethrough. After the composite strip has been cooled to about room temperature it emerges from the cooling chamber 28 and can be conveniently rolled or coiled on a take-up spool 30 and in which form it can be supplied to subsequent forming operations such as stamping, blanking, punching, and the like to produce bearings of the desired configuration and size.

An example of a typical composite bearing material made in accordance with the method hereinabove shown and described which is provided for the purposes of further illustration and is not intended to be limiting, is comprised of a hard metal backing strip having a thickness of about .055 inch and an aluminum-tin bearing lining tenaciously bonded thereon of a thickness generally ranging from about .020 to about .025 inch. After the composite strip has been shaped to the desired bearing configuration accurate finishing and sizing of the bearing lining surface is achieved by further machining whereby the resulting lining thickness is reduced to a final thickness in the order of about .010 to about .015 inch.

An alternate satisfactory method to that hereinbefore described is shown in FIG. 2 and is intended to overcome a problem occasionally encountered when the heating chamber 18 as shown in FIGURE 1 is relatively long and wherein the backing strip 4 having a layer of powder on the upper surface thereof is subjected to some vibration during the course of its travel through the heating chamber. Since the powder layer on the surface of the backing strip is in an essentially fluffy state prior to the hot rolling operation, vibration of the backing strip tends to disturb the uniformity of distribution of the powder thereon and occasionally causes spillage from the edges of the strip during its travel through the heating chamber.

In accordance with the alternate process shown in FIG. 2, a powder 10a of the desired composition and particle size is not applied to the backing strip 4a until a point relatively close to the entrance of the compacting rolls 20a, 22a and during which short travel distance any vibration encountered in the heating chamber 18a does not significantly disturb the distribution of the powder layer 16a on the surface of the backing strip. The backing strip 4a is preheated in a heating chamber 18a to the appropriate temperature in a reducing atmosphere prior to superposing the powder 10a to the upper surface thereof. The powder 10a prior to the application on the preheated surface of the backing strip 4a is preheated in the hopper 8a to a temperature approaching that of the heating chamber 18a by any one of a number of means well known in the art such as, for example, by providing a heating jacket 32 around the hopper 8a.

Aside from separately preheating the backing strip and the powder which is thereafter applied through the metering aperture 12a of the hopper and smoothened into a substantially uniform powder layer 16a by a gate or spreader 14a, the temperatures and the conditions employed during the hot rolling of the backing strip 4a and powder layer 16a thereon are essentially the same to those heretofore described in connection with the method shown in FIGURE 1. The build-up or wave 26a of the heated powder at the entrance portion of the compacting rolls 20a, 22a is clearly shown in FIG. 2. The resultant composite strip 24a as it emerges from the exit portion of the compacting rolls enters the cooling chamber 28a and is comparable to that obtained by the method originally described.

The tensile strength and bond shear strength of four typical aluminum-tin bearing linings made in accordance with the methods herein shown and described are provided in the following table to further illustrate the physical properties of the composite bearing material. It will be appreciated that the alloy compositions tabulated below are provided for the purposes of further illustrating the composite bearing materials made in accordance with the practice of the present invention and are not intended to be limiting in any way:

*Test Samples*

|  | Sample A | Sample B | Sample C | Sample D |
|---|---|---|---|---|
| Nominal Composition Percent: | | | | |
| Tin | 7 | 14 | 18 | 25 |
| Aluminum [1] | 93 | 86 | 82 | 75 |
| Properties: | | | | |
| Tensile Strength, p.s.i. (at room temp.) | 25,600 | 19,000 | 18,600 | 17,800 |
| Bond Strength, p.s.i. (shear) | 13,200 | 12,200 | 12,500 | 10,600 |

[1] The aluminum constituent of the prealloyed aluminum-tin powder comprised an aluminum alloy having a nominal composition of .6% nickel, 2% silicon, 1.2% copper, and the balance aluminum.

Samples A, B, and D containing 7%, 14% and 25% tin, respectively, were prepared by using exclusively prealloyed aluminum-tin powders having a tin content corresponding to that of the resultant bearing lining. Sample C, on the other hand, was prepared by blending a prealloyed aluminum-tin powder containing about 14% tin with the appropriate proportion of elemental tin powder so as to yield a powder blend containing about 18% tin.

In addition to the high tensile strength and high bond strength of the aluminum-tin linings as shown in the table, and composite bearing materials represented by samples C and D were formed into thrust washers of the type employed in automatic transmissions. A standard test loading of about 1000 pounds was applied to the thrust washers and they were observed to provide excellent performance with no heat generation. At the completion of the tests, the thrust washers were examined and were found to have incurred little or no wear or weight loss.

While it will be apparent that the preferred embodiments herein illustrated are well calculated to fulfil the objects above stated, it will be appreciated that the invention is susceptible to modification, variation, and change without departing from the proper scope or fair meaning of the subjoined claims.

What is claimed is:

1. The method of making a composite material suitable for the manufacture of bearings and the like comprising the steps of providing a hard metal backing strip, uniformly blending a mixture of a prealloyed aluminum tin powder containing from about 7% to about 30% tin, an elemental tin powder, and an aluminum powder forming therewith a blended metallic powder containing from about 18% to about 30% tin; said tin powder present in an amount of less than about 15% of said metallic powder, the aluminum constituent in said prealloyed powder and in said aluminum powder comprising aluminum and alloys thereof consisting primarily of aluminum, superposing a relatively uniform layer of said metallic powder on said backing strip, preheating said layer and said backing strip in a reducing atmosphere at a temperature ranging from about 700° F. to about 1100° F., densifying the preheated said layer on said backing strip by passing said strip and said layer thereon through a pair of rolls, the one of said pair of rolls in contact with said layer rotating at a peripheral speed less than the linear speed of said layer causing concurrent compacting and extrusion of said layer and tenaciously bonding said layer to said backing strip, and thereafter rapidly cooling said composite material in a non-oxidizing atmosphere.

2. The method of making a composite material suitable for the manufacture of bearings and the like comprising the steps of providing a hard metal backing strip, uniformly blending a mixture of a prealloyed aluminum-tin powder containing from about 7% to about 30% tin and an elemental tin powder forming therewith a blended metallic powder containing from about 18% to about 30% tin, said tin powder present in an amount of less than about 15% of said metallic powder, the aluminum constituent in said prealloyed powder including aluminum and alloys thereof consisting primarily of aluminum, superposing a relatively uniform layer of said metallic powder on said backing strip, preheating said layer and said backing strip in a reducing atmosphere at a temperature ranging from about 700° F. to about 1100° F., densifying the preheated said layer on said backing strip by passing said strip and said layer thereon through a pair of rolls, the one of said pair of rolls in contact with said layer rotating at a peripheral speed less than the linear speed of said layer causing concurrent compacting and extrusion of said layer and tenaciously bonding said layer to said backing strip, and thereafter rapidly cooling said composite material in a non-oxidizing atmosphere.

3. The method of making a composite material suitable for the manufacture of bearings and the like comprising the steps of providing a hard metal backing strip and a prealloyed aluminum-tin powder containing from about 18% to about 30% tin, the aluminum constituent of said powder including aluminum and alloys thereof consisting primarily of aluminum, superposing a relatively uniform layer of said prealloyed powder on said backing strip, preheating said layer and said backing strip in a reducing atmosphere at a temperature ranging from about 700° F. to about 1100° F., densifying the preheated said layer on said backing strip by passing said strip and said layer thereon through a pair of rolls, the one of said pair of rolls in contact with said layer rotating at a peripheral speed less than the linear speed of said layer causing concurrent compacting and extrusion of said layer and tenaciously bonding said layer to said backing strip, and thereafter rapidly cooling said composite material in a non-oxidizing atmosphere.

4. The method of making a composite material suitable for the manufacture of bearings and the like comprising the steps of providing a hard metal backing strip and a metallic prealloyed powder consisting essentially of aluminum and alloys thereof consisting primarily of aluminum and tin in amounts from about 18% to about 30% of said powder, said powder having a particle size ranging from about 100 mesh to less than about 325 mesh, superposing a relatively uniform layer of said powder on said backing strip, preheating said layer of said powder and said backing strip in a reducing atmosphere at a temperature ranging from about 700° F. to about 1100° F., densifying the preheated said layer on said backing strip by passing said strip and said layer thereon through a pair of rolls, the one of said pair of rolls in contact with said layer rotating at a peripheral speed less than the linear speed of said layer causing concurrent compacting and extrusion of said layer and a reduction of up to about 5% in the thickness of said backing strip whereby said layer is tenaciously bonded to said bearing strip, and thereafter rapidly cooling said composite material in a non-oxidizing atmosphere.

5. The method of making a composite material suitable for the manufacture of bearings and the like comprising the steps of providing a steel backing strip and a metallic prealloyed powder consisting essentially of aluminum and alloys thereof consisting primarily of aluminum and from about 18% to about 25% tin, said powder having a particle size ranging from about 100 mesh to less than about 325 mesh, superposing a relatively uniform layer of said powder on said backing strip, preheating said layer and said backing strip in a reducing atmosphere at a temperature ranging from about 800° F. to about 900° F., densifying the preheated said layer on said backing strip by passing said strip and said layer thereon through a pair of rolls, the one of said pair of rolls in contact with said layer rotating at a peripheral speed less than the linear speed of said layer causing concurrent compacting and extrusion of said layer and a reduction of up to about 5% in the thickness of said backing strip, and thereafter rapidly cooling said composite material in a non-oxidizing atmosphere.

6. In the method described in claim 5 wherein the peripheral speed of said one of said pair of rolls in contact with said layer ranges from about one-tenth to about one-fifth the linear speed of said layer.

7. The method of making a composite material suitable for the manufacture of bearings and the like comprising the steps of providing a hard metal backing strip, uniformly blending a mixture of prealloyed aluminum-tin powder containing from about 7% to about 30% tin, an elemental tin powder, and an aluminum powder forming therewith a blended metallic powder containing from about 18% to about 30% tin; said tin powder present in an amount of less than about 15%, the aluminum constituent in said prealloyed powder and said aluminum powder comprising aluminum and alloys thereof consisting primarily of aluminum, preheating said backing strip in a reducing atmosphere at a temperature ranging from about 700° F. to about 1100° F., independently preheating said metallic powder to a temperature approaching that of said backing strip, superposing a relatively uniform layer of the preheated said metallic powder on the preheated said backing strip, densifying the preheated said layer on said backing strip by passing said strip and said layer thereon through a pair of rolls, the one of said pair of rolls in contact with said layer rotating at a peripheral speed less than the linear speed of said layer causing concurrent compacting and extrusion of said layer and tenaciously bonding said layer to said backing strip, and thereafter rapidly cooling said composite strip in a non-oxidizing atmosphere.

References Cited in the file of this patent

UNITED STATES PATENTS

| 2,350,179 | Marvin | May 30, 1944 |
| 2,815,567 | Gould et al. | Dec. 10, 1957 |

OTHER REFERENCES

Goetzel: "Treatise on Powder Metallurgy," vol. 2, 1950, pages 732, 733.